Aug. 9, 1932.  G. R. CHERVENKA  1,870,237
DYNAMO ELECTRIC MACHINE
Filed March 29, 1930   2 Sheets-Sheet 2

Inventor
G. R. CHERVENKA
By *[signature]*
Att'y.

Patented Aug. 9, 1932

1,870,237

UNITED STATES PATENT OFFICE

GEORGE R. CHERVENKA, OF ST. LOUIS, MISSOURI, ASSIGNOR TO WAGNER ELECTRIC CORPORATION, OF ST. LOUIS, MISSOURI, A CORPORATION OF DELAWARE

DYNAMO ELECTRIC MACHINE

Application filed March 29, 1930. Serial No. 439,928.

This invention relates to improvements in the construction of self-cooled totally enclosed motors, its purpose being to reduce the weight and cost of manufacture, and also to increase the rigidity and improve the electrical efficiency of such machines.

Figure 1:
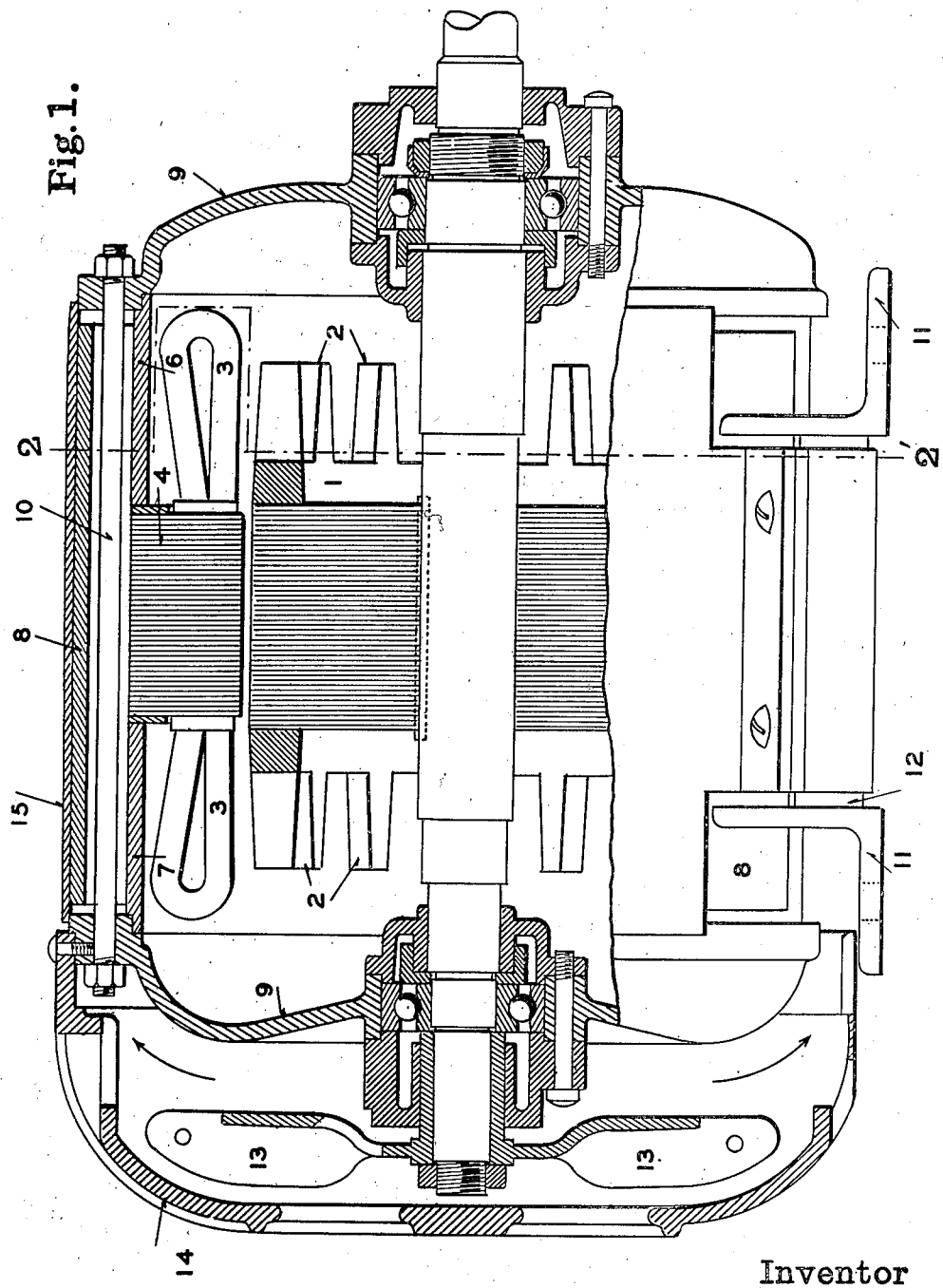
Figure 2:
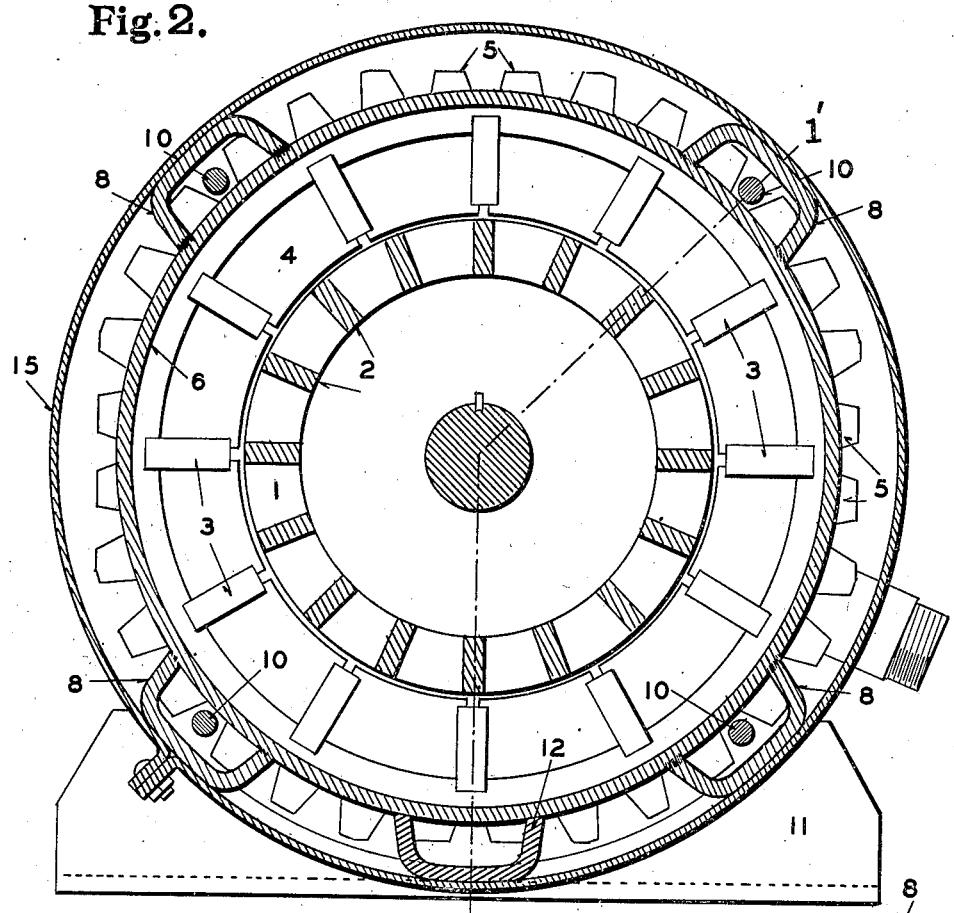
Figure 3:
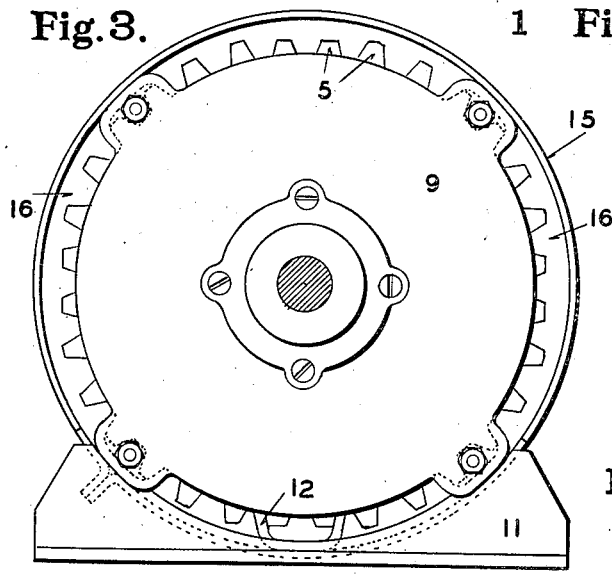
Figure 4:
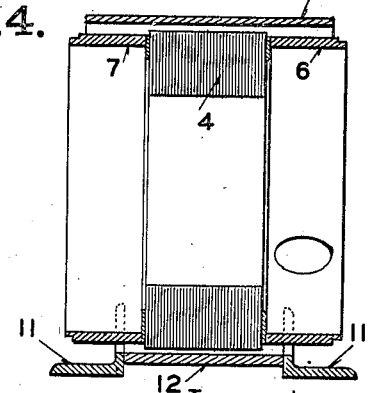

The characteristics and advantages of my invention will appear from the following description and the accompanying drawings illustrating the same and in which Figure 1 is a side view of my improved motor, partly in elevation and partly in section, the section being taken along the line 1—1' of Figure 2, which latter figure is a transverse cross section on the line 2—2' of Figure 1; Figure 3 is an end elevational view of the machine; and Figure 4 is a cross sectional view of the portions of the machine which, upon completion, constitute a single unit whose parts are permanently secured together by welding.

The rotor element of the machine is shown as provided with a squirrel-cage winding 1, the end rings of which have spaced extensions 2 which serve to develop air currents whereby the air in the totally enclosed portion of the machine will be brought into contact with the walls of the enclosure to assist in the dissipation of the internally developed heat.

The stator element of the machine comprises the winding 3 and the laminated field member 4. The laminæ of this member are provided with spaced circumferential extensions 5 to act as heat radiating elements, and in assembling the laminæ these extensions are preferably spaced in register, as indicated, whereby longitudinal grooves are provided which constitute passages for the circulation of air across the periphery of the field member. Cylindrical sheet metal members 6 and 7 constitute end rings which are placed at opposite sides of the laminated field body, and a plurality of channel members 8 extend across the field member and have their edges welded to the outer surfaces of the end rings 6 and 7. Preferably these channel members are of uniform cross-section and of such dimensions as to span one groove or passage across the field member, the sides of the channel being positioned in, and engaging a wall of these passages and at least one of the sides being welded at its lower edge to the laminæ.

The end plates 9 of the machine are grooved to engage the end rings 6 and 7 and are held in place by through bolts 10 which are preferably positioned in the passages in the periphery of the stator member which are embraced by channel members 8.

The supports or feet of the machine are two spaced angle members 11, the vertical web of each of which has its upper edge so formed and of sufficient length as to receive and be welded to the outer faces of at least two of the channel cross members 8. An additional channel member 12 is provided which is shorter than the members 8 and is positioned between and welded at its ends to the central parts of the feet 11.

The shaft of the machine carries a fan 13 positioned outside the end plate 9 and the perforated fan cover 14 is secured to the periphery of the end plate, as shown. A cylindrical split cover 15 surrounds the portion of the machine between the end plates, being supported on the outer faces of the channel members 8. The ends of this cover are of reduced width to pass between the feet as shown. This cover element forms a closure whereby air currents developed by the fan 13 are forced to pass over the field element of the stator and the heat radiating extensions thereof as well as over the end rings 6 and 7 and to quite efficiently dissipate the heat developed within the machine. 16 in Figure 3 indicates the annular air discharge opening at the end of the machine opposite the fan.

It will be noted that the framing of my machine when completed comprises the end rings permanently secured together by the spaced channel cross members 8 welded thereto, and that the channels, by embracing the extensions of the laminæ and by being welded to the laminæ, firmly secure them against any relative movement. Thus the completed machine is very rigid and its manufacture does not require any difficult adjustment of parts or of separable securing means therefor. Also, as a result of welding of the parts together much of the developed heat is conductively transferred to the channel members and end rings and the area of heat radiating surface contacted by the air currents is increased.

Electric welding constitutes the most convenient means of securing the parts of my machine together but by the term "welding" as used in the claims, I intend to include other comparable securing methods, such as brazing or soldering.

Having fully described my invention, what I claim as new and desire to secure by United States Letters Patent is:

1. A stator unit for a dynamo electric machine comprising a laminated field element provided with laminæ extensions arranged in register to form transverse passages in the surface of the field element, retaining rings at opposite sides of the field element, and a plurality of transverse channel members having their edges positioned in said passages and welded at their ends to the rings.

2. In a dynamo electric machine, a laminated field member, the laminæ of which have peripherally spaced heat radiating extensions, end rings at opposite sides of said field member, spaced channel members extending over the field member and inter-engaging with the laminæ extensions and welded at their ends to the rings to secure said rings in fixed relation, end plates cooperating with the end rings to enclose the electrically operative parts of the machine, said end rings being provided with spaced radial extensions, through bolts each passing through a channel member and engaging said end ring extensions to maintain the end rings in position, a cylindrical cover embracing and supported by the channel members and forming therewith and with the field member and end rings, longitudinally extending air passages, and a fan driven by the machine and forcing air through said passages.

3. A stator unit for a dynamo electric machine comprising a laminated field element provided with peripheral spaced laminæ extensions forming heat radiating portions and arranged in register to form transverse passages in the surface of the field element, retainer rings at the opposite sides of the field element, and a plurality of circumferentially spaced longitudinally extending members welded to the rings to secure them in fixed relation, each of said members extending into an aforesaid transverse passage and abutting the adjacent laminæ extensions to prevent relative rotation of the laminæ.

In testimony whereof, I hereunto affix my signature, this 24th day of March, 1930.

G. R. CHERVENKA.